(12) United States Patent
Zhang

(10) Patent No.: US 10,480,432 B2
(45) Date of Patent: Nov. 19, 2019

(54) EXHAUST GAS RECIRCULATION VALVES FOR A FORCED-INDUCTION INTERNAL COMBUSTION ENGINE WITH EXHAUST GAS RECIRCULATION

(71) Applicant: Continental Automotive GmbH, Hannover (DE)

(72) Inventor: Hong Zhang, Tegernheim (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 129 days.

(21) Appl. No.: 15/507,451

(22) PCT Filed: Aug. 10, 2015

(86) PCT No.: PCT/EP2015/068344
§ 371 (c)(1),
(2) Date: Feb. 28, 2017

(87) PCT Pub. No.: WO2016/034370
PCT Pub. Date: Mar. 10, 2016

(65) Prior Publication Data
US 2017/0284322 A1  Oct. 5, 2017

(30) Foreign Application Priority Data
Sep. 3, 2014  (DE) .................. 10 2014 217 591

(51) Int. Cl.
*F02D 41/00* (2006.01)
*F02D 21/08* (2006.01)
(Continued)

(52) U.S. Cl.
CPC ......... *F02D 41/0047* (2013.01); *F02D 21/08* (2013.01); *F02D 23/00* (2013.01);
(Continued)

(58) Field of Classification Search
CPC .............. F02D 41/0047; F02D 41/005; F02D 41/0065; F02D 41/072; F02D 41/0077;
(Continued)

(56) References Cited

U.S. PATENT DOCUMENTS 6,662,562 B2   12/2003  Engel et al. ................... 60/602
8,024,106 B2   9/2011   Graupner et al. ............ 701/108
(Continued)

FOREIGN PATENT DOCUMENTS

DE        4214880 A1    11/1992  ............. F02D 21/08
DE    102007003855 A1    8/2008   ............. F02D 21/08
(Continued)

OTHER PUBLICATIONS

Korean Office Action, Application No. 2018023201968, 7 pages, dated Apr. 3, 2018.
(Continued)

*Primary Examiner* — Jason D Shanske
*Assistant Examiner* — Jessica L Kebea
(74) *Attorney, Agent, or Firm* — Slayden Grubert Beard PLLC

(57) ABSTRACT

The present disclosure relates to internal combustion engines. The teachings thereof may be embodied in methods and devices for actuating an exhaust gas recirculation valve of a forced-induction internal combustion engine with exhaust gas recirculation. A method for building up the charge pressure required to avoid a drop in torque may include: detecting an acceleration indicator; in response, providing an increased target value for an exhaust gas recirculation rate; measuring an instantaneous actual charge pressure; determining a setpoint exhaust gas recirculation rate based on the increased target value, the instantaneous setpoint charge pressure, and the instantaneous actual charge pressure; calculating a control signal using the determined
(Continued)

setpoint exhaust gas recirculation rate; and delivering the control signal to the exhaust gas recirculation valve to change its opening state.

10 Claims, 2 Drawing Sheets

(51) Int. Cl.
   *F02D 23/00* (2006.01)
   *F02D 41/10* (2006.01)
   *F02D 43/04* (2006.01)

(52) U.S. Cl.
   CPC ......... *F02D 41/0007* (2013.01); *F02D 41/10* (2013.01); *F02D 43/04* (2013.01); *F02D 2200/0406* (2013.01); *F02D 2200/602* (2013.01); *Y02T 10/144* (2013.01); *Y02T 10/47* (2013.01)

(58) Field of Classification Search
   CPC .. F02D 2041/0075; F02D 41/10; F02D 21/08; F02D 2021/083
   See application file for complete search history.

(56) References Cited

U.S. PATENT DOCUMENTS

| | | | |
|---|---|---|---|
| 8,627,808 B2 | 1/2014 | Weiss et al. | 123/568.21 |
| 2010/0043762 A1 | 2/2010 | Weiss et al. | 123/568.14 |
| 2010/0101226 A1 | 4/2010 | Shutty et al. | 60/602 |
| 2011/0079008 A1 | 4/2011 | De Ojeda | 60/602 |

FOREIGN PATENT DOCUMENTS

| | | | |
|---|---|---|---|
| DE | 102007042577 B3 | 4/2009 | F02D 41/30 |
| DE | 102008032250 A1 | 1/2010 | F02D 21/08 |
| DE | 102005060350 B4 | 7/2014 | F02D 21/08 |
| JP | 2003526044 A | 9/2003 | F02B 37/22 |
| WO | 2016/034370 A1 | 3/1916 | F02D 21/08 |
| WO | 2008/118660 A1 | 10/2008 | F02M 25/06 |

OTHER PUBLICATIONS

German Office Action, Application No. 102014217591.7, 4 pages, dated Mar. 13, 2015.
International Search Report and Written Opinion, Application No. PCT/EP2015/068344, 21 pages, dated Dec. 22, 2015.
Chinese Office Action, Application No. 201580047502.2, 13 pages, dated Mar. 4, 2019.
Korean Notice of Allowance, Application No. 2018078655994, 3 pages, dated Nov. 19, 2018.

EXHAUST GAS RECIRCULATION VALVES FOR A FORCED-INDUCTION INTERNAL COMBUSTION ENGINE WITH EXHAUST GAS RECIRCULATION

CROSS-REFERENCE TO RELATED APPLICATIONS

This application is a U.S. National Stage Application of International Application No. PCT/EP2015/068344 filed Aug. 10, 2015, which designates the United States of America, and claims priority to DE Application No. 10 2014 217 591.7 filed Sep. 3, 2014, the contents of which are hereby incorporated by reference in their entirety.

TECHNICAL FIELD

The present disclosure relates to internal combustion engines. The teachings thereof may be embodied in methods and devices for actuating an exhaust gas recirculation valve of a forced-induction internal combustion engine with exhaust gas recirculation.

BACKGROUND

DE 10 2005 060 350 B4 discloses a method for regulating a combustion process of a forced-induction internal combustion engine with exhaust gas recirculation, which can be operated with different fuel-air ratios. This involves metering a fresh air stream and a recirculated exhaust gas stream to the combustion process in a targeted manner, a respective measurement variable for the fresh air stream and for the recirculated exhaust gas stream being determined. The measurement variables for the fresh air stream and for the recirculated exhaust gas stream are determined directly by a mass-flow and/or volume-flow measurement device. When the method is used in turbo motors, these are operated in the lower load region, close to the surge limit of the compressor.

DE 10 2007 042 577 B3 discloses a method for regulating a combustion process and a control device. In this method, fuel for combustion is injected into the internal combustion engine, exhaust gas is recirculated into an intake duct, a time point of combustion is detected, the detected time point is compared to a setpoint value and the injection is changed depending on the comparison result to move the combustion toward the setpoint value. Part of the change in injection is converted into an adaptation value for regulating the exhaust gas recirculation, to move the combustion toward the setpoint value.

DE 10 2007 003 855 A1 discloses a method for controlling the exhaust gas recirculation in an internal combustion engine, in which part of the exhaust gas from the exhaust gas tract is recirculated via an external line to the intake pipe, and is mixed with the fresh air supplied to the cylinders. Another part of the exhaust gas is again supplied, via the valves, internally to the combustion space of the engine. The internally recirculated exhaust gas quantity is set by controlling the cam phases in dependence on the engine load and the engine speed. A setpoint value for the internal exhaust gas recirculation rate is calculated as the difference between the setpoint value of the exhaust gas recirculation and the external exhaust gas recirculation rate.

Such internal combustion engines with exhaust gas recirculation, in the case of engines of lambda-1 design, for example gasoline engines, can suffer a drop in torque during acceleration processes. These problems are caused by opening of the exhaust gas recirculation valve reducing the air density upstream of the compressor. As a consequence, the respective cylinders received too little air until the charge pressure has once again built up to a sufficient value. It is known to carry out this buildup of the charge pressure to a sufficient value by actuating the exhaust gas recirculation valve using a ramp-shaped actuation signal. However, such a charge pressure buildup is slow and requires complex application.

SUMMARY

The teachings of the present disclosure may be embodied in methods and devices for building up the charge pressure required to avoid a drop in torque of an internal combustion engine having exhaust gas recirculation, in which the charge pressure buildup takes place quicker and more simply.

In some embodiments, a method for building up the charge pressure required to avoid a drop in torque of an internal combustion engine having an exhaust gas turbocharger, which has a fresh air inlet duct, an exhaust gas recirculation duct with an exhaust gas recirculation valve, and a mixer, may include: recognizing a desire for acceleration, once the desire for acceleration has been recognized, providing an increased target value for the exhaust gas recirculation rate, measuring the instantaneous actual charge pressure, determining a setpoint exhaust gas recirculation rate from the increased target value for the exhaust gas recirculation rate, the instantaneous setpoint charge pressure and the instantaneous actual charge pressure, determining a control signal, that corresponds to an actuating variable for the exhaust gas recirculation valve, using the determined setpoint exhaust gas recirculation rate, and supplying the control signal to the exhaust gas recirculation valve in order to change the opening state of the latter.

In some embodiments, the increased target value for the exhaust gas recirculation rate is predefined in dependence on the instantaneous setpoint air mass and the instantaneous rotation speed of the shaft of the exhaust gas turbocharger.

In some embodiments, the setpoint exhaust gas recirculation rate is calculated according to the following relation:

$$\text{eta\_egr\_soll} = 1 - (1 - \text{eta\_egr\_soll\_0}) \cdot (P\_\text{lade\_soll}/P\_\text{lade\_ist}),$$

where eta_egr_soll is the instantaneous setpoint exhaust gas recirculation rate, eta_egr_soll_0 is the target value for the exhaust gas recirculation rate, P_lade_soll is the setpoint value for the charge pressure, and P_lade_ist is the instantaneous actual value of the charge pressure.

In some embodiments, the actuating variable for the exhaust gas recirculation valve is determined from the calculated setpoint exhaust gas recirculation rate using a stored characteristic curve for the exhaust gas recirculation valve.

In some embodiments, calculation of the setpoint exhaust gas recirculation rate and determining of the actuating variable for the exhaust gas recirculation valve are undertaken when the predefined target value for the exhaust gas recirculation rate exceeds the instantaneous exhaust gas recirculation rate by a predefined difference value.

In some embodiments, the setpoint exhaust gas recirculation rate is made equal to the predefined target value for the setpoint exhaust gas recirculation rate when the predefined target value for the exhaust gas recirculation rate does not exceed the instantaneous exhaust gas recirculation rate by a predefined difference value.

Some embodiments may include devices for building up the charge pressure required to avoid a drop in torque of an internal combustion engine, including: an exhaust gas turbocharger (1) with a turbine (2) and a compressor (4) that is connected to the turbine by a shaft (3), an exhaust gas duct (5) connected to the outlet (2b) of the turbine (2), an exhaust gas recirculation duct (6) which branches off from the exhaust gas duct (5) and whose outlet is connected to a first inlet (7a) of a mixer (7) whose outlet (7c) is connected to an inlet (4a) of the compressor (4), an exhaust gas recirculation valve (8) arranged in the exhaust gas recirculation duct (6), a fresh air inlet duct (9) whose outlet is connected to a second inlet (7b) of the mixer (7), and a control unit (10) provided in order to prepare actuation signals (s1) for the exhaust gas recirculation valve (8), characterized in that the control unit (10) is designed to carry out a method like those described above.

BRIEF DESCRIPTION OF THE DRAWINGS

There follows a more detailed description with reference to the drawings, in which.

DETAILED DESCRIPTION

Some embodiments include methods for building up the charge pressure required to avoid a drop in torque of an internal combustion engine having an exhaust gas turbocharger, which has a fresh air inlet duct, an exhaust gas recirculation duct with an exhaust gas recirculation valve, and a mixer. The methods may include:

recognizing a desire for acceleration, once the desire for acceleration has been recognized, providing an increased target value for the exhaust gas recirculation rate, measuring the instantaneous actual charge pressure, determining a setpoint exhaust gas recirculation rate from the increased target value for the exhaust gas recirculation rate, the instantaneous setpoint charge pressure and the instantaneous actual charge pressure, determining a control signal, that corresponds to an actuating variable for the exhaust gas recirculation valve, using the determined setpoint exhaust gas recirculation rate, and supplying the control signal to the exhaust gas recirculation valve to change the opening state of the latter.

Some embodiments may include devices for building up the charge pressure required to avoid a drop in torque of an internal combustion engine. The devices may include:

an exhaust gas turbocharger with a turbine and a compressor that is connected to the turbine by a shaft, an exhaust gas duct connected to the outlet of the turbine, an exhaust gas recirculation duct which branches off from the exhaust gas duct and whose outlet is connected to a first inlet of a mixer whose outlet is connected to an inlet of the compressor, an exhaust gas recirculation valve arranged in the exhaust gas recirculation duct, a fresh air inlet duct whose outlet is connected to a second inlet of the mixer, and a control unit provided in order to prepare actuation signals for the exhaust gas recirculation valve, wherein the control unit is designed to carry out a method having the steps indicated in one of the preceding claims.

In these embodiments, the charge pressure required to avoid a drop in torque of an internal combustion engine having exhaust gas recirculation takes place quicker and more simply than in the prior art. In particular, the opening state of the exhaust gas recirculation valve changes at approximately the same speed as that with which the charge pressure required to avoid a drop in torque is built up. The change in the opening state of the exhaust gas recirculation valve is therefore adapted to the charge pressure buildup speed.

Using the instantaneous actual charge pressure to determine the setpoint exhaust gas recirculation rate may increase the effectiveness. If the instantaneous actual charge pressure increases rapidly, then the setpoint exhaust gas recirculation rate will also be increased rapidly. If the instantaneous actual charge pressure increases slowly, then the setpoint exhaust gas recirculation rate will also be increased slowly.

Figure 1:
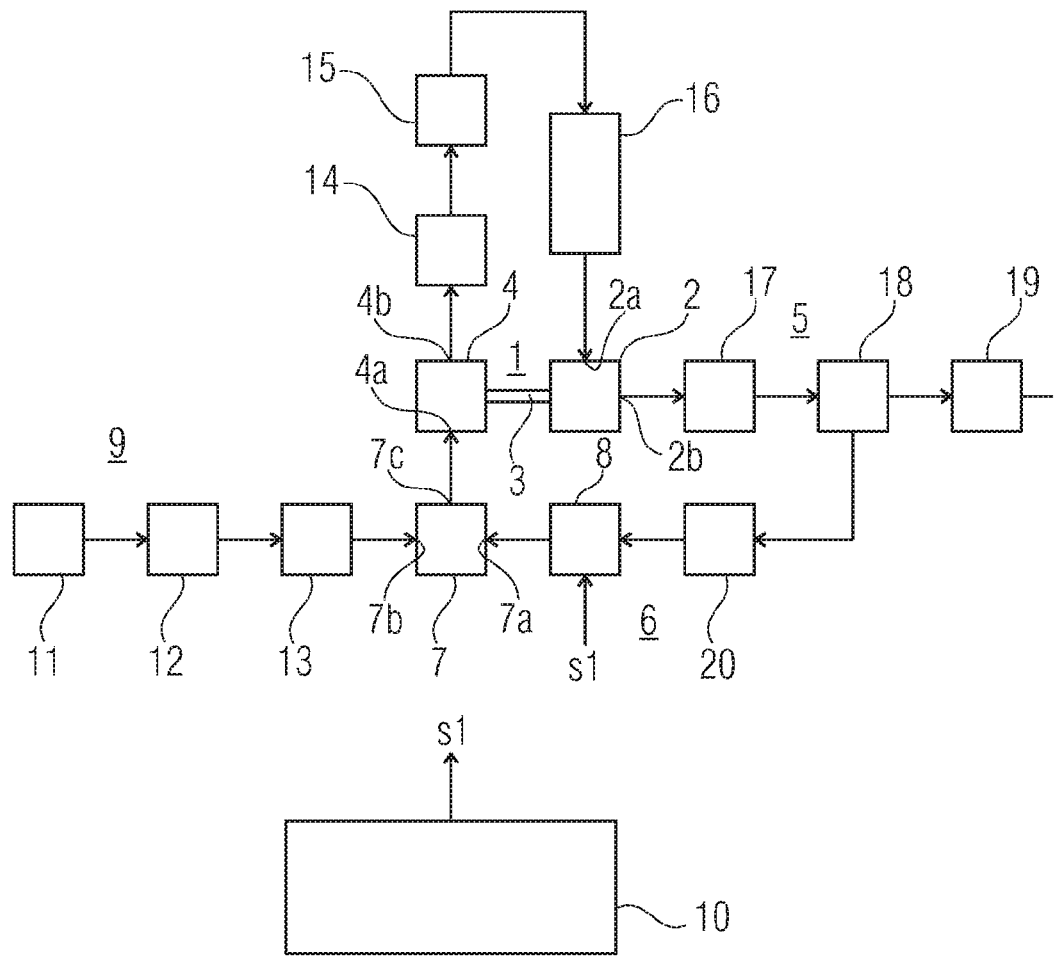
FIG. 1 is a block diagram illustrating a device for building up the charge pressure required to avoid a drop in torque of an internal combustion engine having an exhaust gas turbocharger with exhaust gas recirculation, according to teachings of the present disclosure.

The device shown in FIG. 1 has a fresh air inlet duct 9 in which are contained a fresh air inlet 11, an air purification device 12 and an inlet flap 13. The device shown also has an exhaust gas duct 5 which is connected to the outlet 2b of the turbine 2 of an exhaust gas turbocharger 1. The exhaust gas duct 5 contains a catalytic converter 17, a branching point 18 and a silencer 19. An exhaust gas recirculation duct 6 branches off at the branching point 18. This duct 6 has an exhaust gas cooler 20 and an exhaust gas recirculation valve 8.

The outlet of the exhaust gas recirculation valve 8 is connected to a first inlet 7a of a mixer 7. The outlet of the inlet flap 13 of the fresh air inlet duct 9 is connected to the second inlet 7b of the mixer 7. The outlet 7c of the mixer 7 is connected to the inlet 4a of a compressor 4 of the exhaust gas turbocharger. The compressor 4 has a compressor rotor which is secured in rotation on a shaft 3 which is also secured in rotation with a turbine rotor of the turbine 2.

The exhaust gases of an internal combustion engine 16 are supplied, in the form of an exhaust gas stream, to the inlet 2a of the turbine. This exhaust gas stream drives the turbine rotor. This also rotates the shaft 3 of the exhaust gas turbocharger 1. This rotation of the shaft is transmitted to the compressor rotor. The compressor draws in and compresses the fresh air/exhaust gas mixture created in the mixer 7 and supplied to the inlet 4a of the compressor. The compressed fresh air/exhaust gas mixture is expelled at the outlet 4b of the compressor and is supplied, via an intercooler 14 and a throttle flap 15, to the internal combustion engine 16. As already explained above, the exhaust gas created in the internal combustion engine is expelled at the inlet 2a of the turbine 2.

The device shown in FIG. 1 also has a control unit 10 which contains a processing unit and multiple memory units in which tables and characteristic diagrams are stored. The output signals from a multiplicity of sensors, which supply the control unit with actual values of a multiplicity of parameters, are supplied to the control unit 10 as input signals. These include, inter alia, a sensor which detects actuation of the accelerator pedal. The output signals from this sensor tell the control unit 10 that there is a desire for acceleration. Also included is a sensor which provides the control unit 10 with information relating to the actual charge pressure. This sensor is provided between the outlet of the compressor 4 and the internal combustion engine 16, for example between the intercooler 14 and the throttle flap 15 or between the compressor 4 and the intercooler 14.

The control unit 10 evaluates these output signals from the sensors, the saved tables and the saved characteristic diagrams to calculate control signals which are used to actuate components of the device shown. Inter alia, the control unit 10 is designed such that it calculates control signals s1 for the exhaust gas recirculation valve 8 and transmits these thereto. These control signals s1 cause the opening state of the exhaust gas recirculation valve 8 to change, depending on the immediate requirement, to supply more or less exhaust gas to the mixer 7. In particular, the actuation signals s1 for the exhaust gas recirculation valve 8 are generated such that there is no drop in torque in the event of an acceleration process triggered by the driver actuating the accelerator pedal.

When there is a desire for acceleration, the target exhaust gas recirculation rate is increased. In that context, the exhaust gas recirculation valve 8 must be controlled such that the reduction in air density, that is caused by opening the exhaust gas recirculation valve 8, is compensated for by a buildup of charge pressure, so as to avoid a drop in torque. The increased value for the target exhaust gas recirculation rate is provided by the control unit 10 in dependence on the setpoint air mass or the setpoint torque and the rotation speed of the shaft 3 of the exhaust gas turbocharger.

Opening the exhaust gas recirculation valve 8 reduces the air density in a manner corresponding to the actual exhaust gas recirculation rate. Thus, the actual partial pressure P_lade_air_ist for fresh air downstream of the compressor 4 is determined as follows:

$$P\_lade\_air\_ist = P\_lade\_ist(1-eta\_egr\_ist) \quad (1)$$

where P_lade_ist is the actual charge pressure, eta_egr_ist is the actual exhaust gas recirculation rate, and P_lade_air_ist is the actual partial charge pressure for fresh air.

If, in the case of an acceleration procedure, the actual partial charge pressure for fresh air can follow the setpoint partial charge pressure for fresh air, there will be no drop in torque.

Proceeding from equation (1), it follows that the setpoint exhaust gas recirculation rate eta_egr_soll dependent on the actual charge pressure must be determined such that the following relation holds:

$$P\_lade\_ist \cdot (1-eta\_egr\_soll) = P\_lade\_air\_soll \quad (2)$$

The following relationship can be defined between the setpoint partial charge pressure for fresh air P_lade_air_soll and the setpoint charge pressure and the target exhaust gas recirculation rate eta_egr_soll_0:

$$P\_lade\_air\_soll = (1-eta\_egr\_soll\_0) \cdot P\_lade\_soll\_0 \quad (3)$$

Plugging equation (3) into equation (2) gives:

$$eta\_egr\_soll = 1-(1-eta\_egr\_soll\_0) \cdot P\_lade\_soll/P\_lade\_ist) \quad (4)$$

The value calculated using equation (4) is valid for the case in which the setpoint charge pressure is greater than the actual charge pressure. As soon as the setpoint charge pressure is less than or equal to the actual charge pressure, the setpoint exhaust gas recirculation rate eta_egr_soll is set equal to the target value eta_egr_soll_0. The setpoint exhaust gas recirculation rate calculated using equation (4) has a maximum value of eta_egr_soll_0 and a minimum value of zero.

From the instantaneous setpoint value for the exhaust gas recirculation rate, the calculation unit of the control unit 10 determines the actuating variable for the exhaust gas recirculation valve opening using an exhaust gas recirculation valve characteristic curve stored in a memory unit of the control unit 10, and outputs this variable, in the form of the control signals s1, to the exhaust gas recirculation valve 8.

Calculation and output of the value for the exhaust gas recirculation rate, using equation (4), is carried out only when the target value for the exhaust gas recirculation rate eta_egr_soll_0 predefined from the setpoint air mass and the rotation speed of the turbocharger shaft is greater than the actual exhaust gas recirculation rate by a predetermined difference value DELTA, thus:

$$Eta\_egr\_soll\_0 > eta\_egr\_ist + DELTA$$

The value DELTA is for example 4%.

In this approach, the exhaust gas recirculation valve 8 does not change its opening state too often, that is to say it does not move too restlessly. In any other case, the setpoint exhaust gas recirculation rate eta_egr_soll is directly set equal to the target value eta_egr_soll_0.

Figure 2:
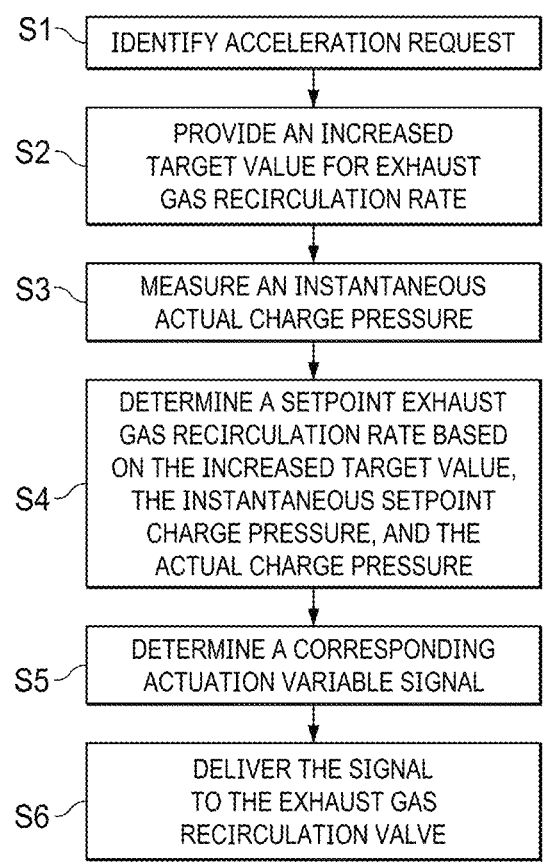
FIG. 2 is a flowchart illustrating a method for building up the charge pressure required to avoid a drop in torque of an internal combustion engine having an exhaust gas turbocharger with exhaust gas recirculation according to teachings of the present disclosure.

FIG. 2 shows a method for building up the charge pressure required to avoid a drop in torque. Step S1 may include recognizing a desire for acceleration on the part of the driver, for example by means of the output signals of a sensor which detects the movements of the accelerator pedal. Then, a step S2 after recognizing the desire for acceleration, involves the control unit providing an increased target value for the exhaust gas recirculation rate. Then, a step S3 involves measuring the instantaneous actual charge pressure. A subsequent step S4 involves the control unit 10 determining a setpoint exhaust gas recirculation rate from the increased target value for the exhaust gas recirculation rate, the instantaneous setpoint charge pressure and the instantaneous actual charge pressure. Then, a step S5 involves determining a control signal, that corresponds to an actuating variable for the exhaust gas recirculation valve, using the determined setpoint exhaust gas recirculation rate. Finally, a step S6 involves supplying the control signal to the exhaust gas recirculation valve to change the opening state of the latter.

What is claimed is:

1. A method for building up the charge pressure required to avoid a drop in torque of an internal combustion engine having an exhaust gas turbocharger, which has a fresh air inlet duct, an exhaust gas recirculation duct with an exhaust gas recirculation valve, and a mixer, the method including:
   detecting an actuation of an accelerator pedal;
   determining a target value for an exhaust gas recirculation rate in response to the actuation of the accelerator pedal;
   measuring an instantaneous actual charge pressure;
   determining a setpoint exhaust gas recirculation rate based on the target value for the exhaust gas recirculation rate, a setpoint charge pressure corresponding to the target value for the exhaust gas recirculation rate, and the measured instantaneous actual charge pressure;
   calculating a control signal corresponding to an actuating variable for the exhaust gas recirculation valve, using the determined setpoint exhaust gas recirculation rate; and
   delivering the control signal to the exhaust gas recirculation valve to change an opening state of the exhaust gas recirculation valve;

wherein the target value for the exhaust gas recirculation rate is predefined in dependence on a setpoint air mass and an instantaneous rotation speed of a shaft of the exhaust gas turbocharger.

2. The method as claimed in claim 1, wherein the setpoint exhaust gas recirculation rate is calculated according to the following relation:

$$\text{eta\_egr\_soll} = 1 - (1 - \text{eta\_egr\_soll\_0}) \cdot (P\_\text{lade\_soll}/P\_\text{lade\_ist}), \text{ where}$$

eta_egr_soll is the setpoint exhaust gas recirculation rate,
eta_egr_soll_0 is the target value for the exhaust gas recirculation rate,
P_lade_soll is the setpoint charge pressure, and
P_lade_ist is the measured instantaneous actual charge pressure.

3. The method as claimed in claim 1, wherein the actuating variable for the exhaust gas recirculation valve depends at least in part on the determined setpoint exhaust gas recirculation rate and a stored characteristic curve for the exhaust gas recirculation valve.

4. The method as claimed in claim 2, further comprising: determining the actuating variable for the exhaust gas recirculation valve if the target value for the exhaust gas recirculation rate exceeds an actual exhaust gas recirculation rate by a predefined difference value.

5. The method as claimed in claim 4, wherein the setpoint exhaust gas recirculation rate is made equal to the target value for the setpoint exhaust gas recirculation rate when the target value for the exhaust gas recirculation rate does not exceed the instantaneous exhaust gas recirculation rate by the predefined difference value.

6. A device for building up the charge pressure required to avoid a drop in torque of an internal combustion engine, the device comprising:
an exhaust gas turbocharger with a turbine and a compressor connected to the turbine by a shaft;
an exhaust gas duct connected to an outlet of the turbine;
an exhaust gas recirculation duct branching off from the exhaust gas duct with an exhaust gas recirculation duct outlet connected to a first inlet of a mixer with a mixer outlet connected to an inlet of the compressor;
an exhaust gas recirculation valve in the exhaust gas recirculation duct;
a fresh air inlet duct with an outlet connected to a second inlet of the mixer; and
a control unit to prepare actuation signals for the exhaust gas recirculation valve;
wherein the control unit:
detects an actuation of an accelerator pedal;
determines a target value for an exhaust gas recirculation rate in response to the actuation of the accelerator pedal;
measures an instantaneous actual charge pressure;
determines a setpoint exhaust gas recirculation rate based on the target value for the exhaust gas recirculation rate, a setpoint charge pressure corresponding to the target value for the exhaust gas recirculation rate, and the instantaneous actual charge pressure;
calculates a control signal corresponding to an actuating variable for the exhaust gas recirculation valve, using the determined setpoint exhaust gas recirculation rate; and
delivers the control signal to the exhaust gas recirculation valve to change an opening state of the exhaust gas recirculation valve;
wherein the setpoint exhaust gas recirculation rate is calculated according to the following relation:

$$\text{eta\_egr\_soll} = 1 - (1 - \text{eta\_egr\_soll\_0})(P\_\text{lade\_soll}/P\_\text{lade\_ist}), \text{ where}$$

eta_egr_soll is the setpoint exhaust gas recirculation rate,
eta_egr_soll_0 is the target value for the exhaust gas recirculation rate,
P_lade_soll is the setpoint charge pressure, and
P_lade_ist is the measured instantaneous actual charge pressure.

7. A method for building up the charge pressure required to avoid a drop in torque of an internal combustion engine having an exhaust gas turbocharger, which has a fresh air inlet duct, an exhaust gas recirculation duct with an exhaust gas recirculation valve, and a mixer, the method including:
detecting an actuation of an accelerator pedal;
determining a target value for an exhaust gas recirculation rate in response to the actuation of the accelerator pedal;
measuring an instantaneous actual charge pressure;
determining a setpoint exhaust gas recirculation rate based on the target value for the exhaust gas recirculation rate, a setpoint charge pressure corresponding to the target value for the exhaust gas recirculation rate, and the measured instantaneous actual charge pressure;
calculating a control signal corresponding to an actuating variable for the exhaust gas recirculation valve, using the determined setpoint exhaust gas recirculation rate; and
delivering the control signal to the exhaust gas recirculation valve to change an opening state of the exhaust gas recirculation valve;
wherein the setpoint exhaust gas recirculation rate is calculated according to the following relation:

$$\text{eta\_egr\_soll} = 1 - (1 - \text{eta\_egr\_soll\_0})(P\_\text{lade\_soll}/P\_\text{lade\_ist}), \text{ where}$$

eta_egr_soll is the setpoint exhaust gas recirculation rate,
eta_egr_soll_0 is the target value for the exhaust gas recirculation rate,
P_lade_soll is the setpoint charge pressure, and
P_lade_ist is the measured instantaneous actual charge pressure.

8. The method as claimed in claim 7, wherein the actuating variable for the exhaust gas recirculation valve depends at least in part on the determined setpoint exhaust gas recirculation rate and a stored characteristic curve for the exhaust gas recirculation valve.

9. The method as claimed in claim 7, further comprising determining the actuating variable for the exhaust gas recirculation valve if the target value for the exhaust gas recirculation rate exceeds an actual exhaust gas recirculation rate by a predefined difference value.

10. The method as claimed in claim 9, wherein the setpoint exhaust gas recirculation rate is made equal to the target value for the setpoint exhaust gas recirculation rate when the exhaust gas recirculation rate does not exceed the instantaneous exhaust gas recirculation rate by the predefined difference value.

* * * * *